United States Patent [19]
Lancia et al.

[11] 3,883,757
[45] May 13, 1975

[54] BRIDGE CIRCUIT FOR ENVIRONMENTAL CONDITION CONTROL

[76] Inventors: Frederick N. Lancia, 1260 Gresham Rd., Columbus, Ohio 43204; Albert O. Kesterson, 6566 Calgary Ct., Columbus, Ohio 43239; Ralf C. Liebert, 580 Keys Ln., Worthington, Ohio 43085

[22] Filed: Apr. 20, 1972

[21] Appl. No.: 245,872

[52] U.S. Cl. ............... 307/311; 307/308; 328/1
[51] Int. Cl. ............................................. H03k 3/42
[58] Field of Search ........... 307/308, 311; 328/1, 2, 328/208; 165/21; 330/1 A

[56] References Cited
UNITED STATES PATENTS

| | | | |
|---|---|---|---|
| 2,522,348 | 9/1950 | Dahline | 328/2 X |
| 3,182,222 | 5/1965 | Lacy et al. | 307/308 X |
| 3,459,943 | 8/1969 | Harnden, Jr. | 307/311 X |

*Primary Examiner*—John W. Huckert
*Assistant Examiner*—B. P. Davis
*Attorney, Agent, or Firm*—Anthony D. Cennamo et al.

[57] ABSTRACT

Temperature and/or humidity electrical/electronic controls to maintain a room at a constant temperature and humidity. The controls provide an on-off function for a conditioner or a step function to actuate one or more temperature and/or humidity conditioners in response to a percentage of change. A bridge control circuit operable to activate either of a pair of triac switching circuits includes a unique arrangement of sensitivity and hysteresis components.

10 Claims, 7 Drawing Figures

BRIDGE CIRCUIT FOR ENVIRONMENTAL CONDITION CONTROL

BACKGROUND OF THE INVENTION

The prior art is replete with temperature and humidity control circuits; and there is apparatus that combines both the temperature and humidity functions. Each of the prior art devices, however, have many features that render them unsuitable for their intended purpose. In the first instance, the cost versus accuracy curve is out of proportion — that is, to obtain accuracy the cost is prohibitive; while on the other hand, low cost devices are so inaccurate that they are relatively useless.

In operation, it has been found that one of the serious electrical disadvantages of the prior art devices are their tendency to "hunt" about a set point. That is, at a given setting — whether it is temperature or humidity — the apparatus is on and off, back and forth. At times heating and cooling (or wetting and drying) are alternately turned on and off as the controls hunt.

A more significant electrical disadvantage is that heating-cooling or wetting-drying apparatus in major installations is large and expensive. Even in those installations where several pieces of apparatus are utilized, they are still large and expensive. In the prior art systems a slight deviation of the temperature or humidity from the set point causes the entire system to turn on.

Reference is made to U. S. Pat. No. 3,522,451 wherein a bridge circuit is disclosed and claimed for a multi-stage controller; and to the copending patent application Ser. No. 24,450, where there is disclosed and claimed a multi-stage environmental condition controller.

SUMMARY OF THE INVENTION

The present invention provides apparatus and a system for maintaining a desired temperature and humidity without the above-noted disadvantages. The bridge circuit is basically that of the aforementioned patent with noted improvements and innovations. Generally, to avoid the "hunting" of the system about the set point, the bridge circuit of the present invention includes additional components to give a hystesis effect to the actuation of the controller. That is, the deviation of the temperature or hunting must exceed a predetermined amount above or below the set point prior to actuation of the condition apparatus. Further, the bridge circuit includes additional components to provide a unique and very accurate sensitivity circuit for energizing either one of a pair of triac switching circuits. The non-contact type of switching improves considerably the reliability and accuracy of performance.

The bridge circuit for accurately and reliably effecting the above-noted set points and more specifically predetermined settings comprises a new arrangement of resistors operable to energize either of a pair of triac circuits controlled by a pair of pilot lights. The components are utilized in unique manner to maintain simplicity, accuracy, and continuous reliability without recalibration.

OBJECTS

It is accordingly an object of the present invention to provide a new and improved temperature and/or humidity control system for actuating conditioning apparatus.

It is a further object of the present invention to provide in an environmental control system a bridge circuit for actuating either of a pair of non-contact type of control switches.

It is another object of the present invention to provide a temperature and/or humidity control system having a new and improved bridge circuit for effecting accurately and reliably the necessary controls.

It is another object of the present invention to provide an environmental control system a bridge circuit for obtaining the desired percentage of change control and to provide hysteresis to eliminate hunting.

Other objects and features of the present invention will become apparent from the following detailed description when taken in conjunction with the drawings.

DETAILED DESCRIPTION OF THE DRAWINGS

Figure 1:
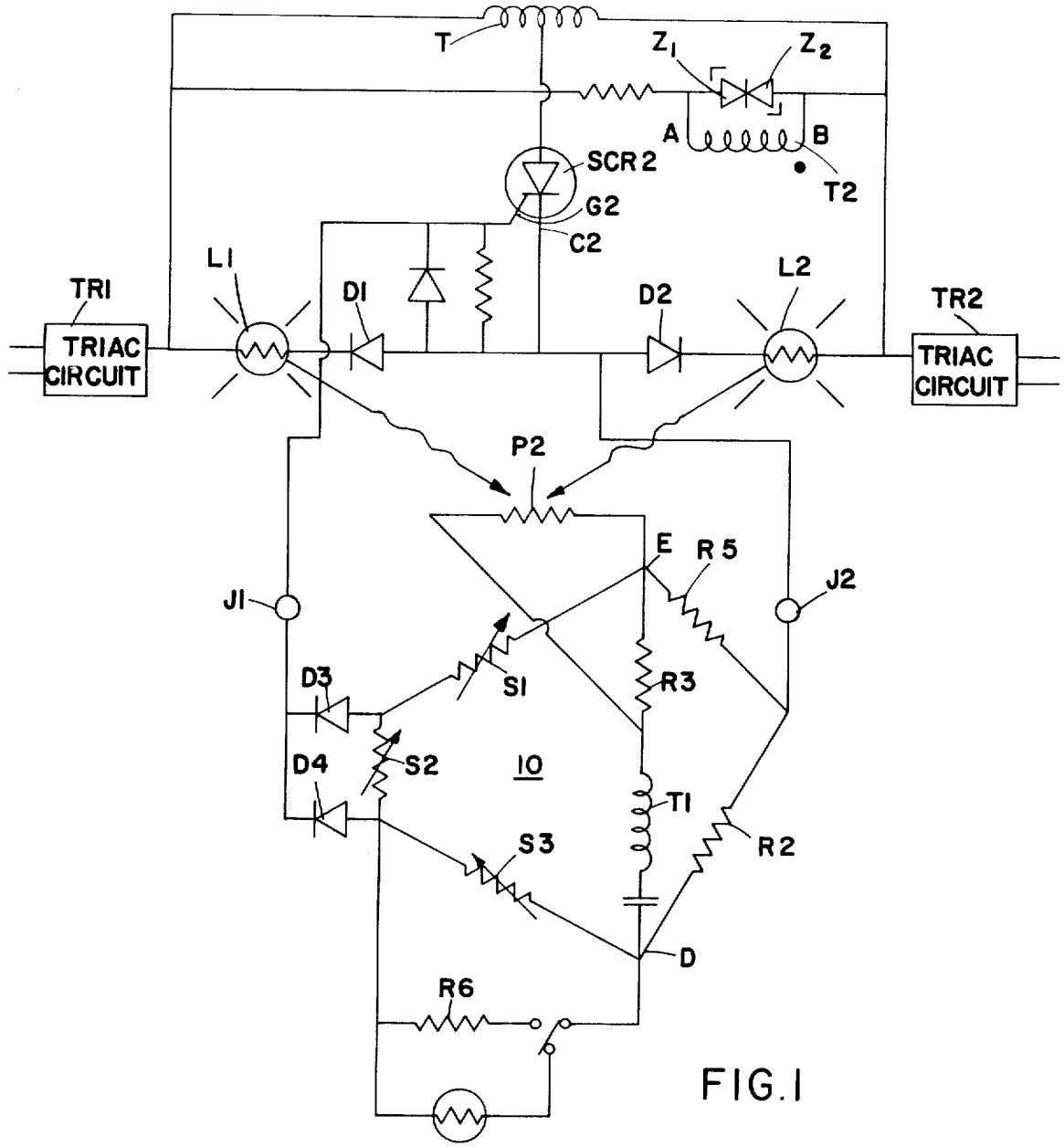
FIG. 1 and FIG. 1A illustrate in detail the bridge and non-contact control circuit of the preferred embodiment of the present invention.

The bridge circuit of FIG. 1 is described hereinafter to an on-off humidity controller. It is to be expressly understood that other environmental conditions such as temperature and pollutants may be detected and controlled. Further, the use of multi-stage controllers as shown in the aforementioned co-pending patent application is also envisioned.

Very generally, in operation of the temperature control system of FIG. 1, the bridge circuit 10 senses a variation in humidity to cause actuation of either a humidifier or dehumidifier by energizing either of a pair of non-contact switch circuits. The pilot lights L1 and L2, that visually indicate which controller has been actuated, also energize a photo responsive detector P2 which in turn energize through the bridge either of a pair of triac switching circuits.

The bridge circuit of the present invention as shown in FIG. 1 utilizes a pair of triac circuits TR1 and TR2 as sensitive switches operative in response to a sensed condition of the bridge to activate or deactivate — in this embodiment the humidity means or the dehumidifier.

With specific reference to the bridge circuit of FIG. 1, the bridge shown is that of the aforementioned patent with the improvements thereto as set forth hereinafter. In operation of the bridge 10, the elements of the aforementioned patent comprise transformer T1, resistor R2, and R5, together with set point variable resistor S1 and sensor variable resistor S3.

The transformer T1 is a filament type of secondary winding of the transformer T. The winding T1 is connected to the inside of the bridge 10. Resistor S1 is a variable resistance and is utilized basically for establishing the set point. Resistor S3 is also a variable resistor and is also operative basically as the sensor resistor.

If the environmental condition being monitored should vary, the resistance of the sensor resistor S1 will decrease or increase in accordance with the variations. This causes the bridge to become unbalanced and in turn causes an a.c. voltage to be applied across either of a pair of actuating elements.

A specific circuit difference from the aforementioned patent is the triac switching circuits in lieu of the relay switching circuits. The results, as shown hereinafter, are much more accurate and a more reliable response is had together with added features.

Figure 2:
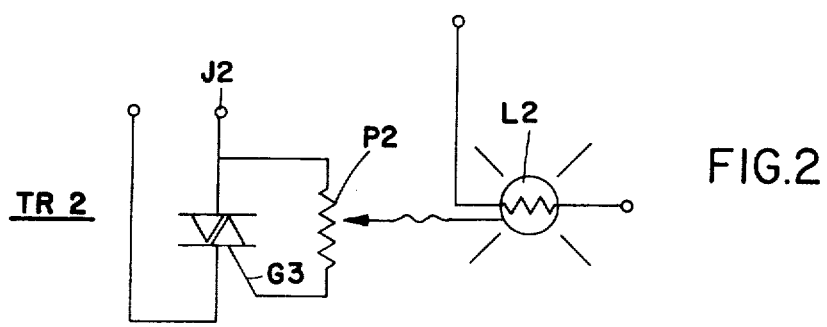
FIG. 2 is a specific illustration of the triac circuit utilized in FIG. 1.

With specific reference now to FIG. 2 in principle triac TR2 (of FIG. 1) can be turned on when a low resistance is placed between the gate G3 and terminal J2. To provide the resistance a photoconductor R2 is connected between the gate G3 and terminal J2. When light strikes the photoconductor, its resistance is lowered and the triac TR2 switches on. Specifically the photoconductor P2 is kept in the dark and then exposed to the light source L2 upon a sensed variance in the condition. That is, current from the bridge causes the lamp L2 to glow.

Figure 3:
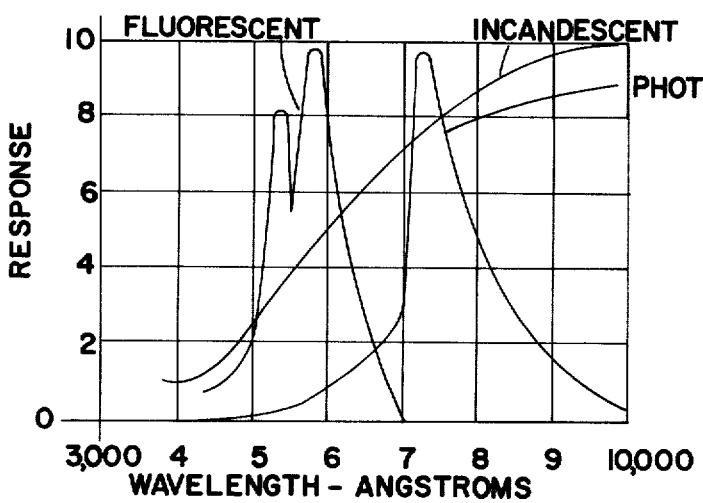
FIG. 3 is a graphical waveform of the photoconductor response.

In the preferred embodiment of the present invention, the light source L2 also has the function of serving as a pilot light, that is, it is visible from outside the control box. In this respect, it is to be noted that the photoconductor would "see" some room light through the glass envelope of the light source L2. However, since the controls will be used almost exclusively in rooms illuminated with fluorescent light, a photo-conductor was chosen that is blind to fluorescent light and sensitive to incandescent light. Such a photo-conductor has a high resistance in the presence of fluorescent light and a low resistance when exposed to incandescent light. The graphical illustration of FIG. 3 is that of the photo-conductor response to an incandescent light and non-response to a fluorescent light. An incandescent pilot lamp was selected to operate at below rated voltage to result in a life-time in excess of 5 years.

Figure 1A:
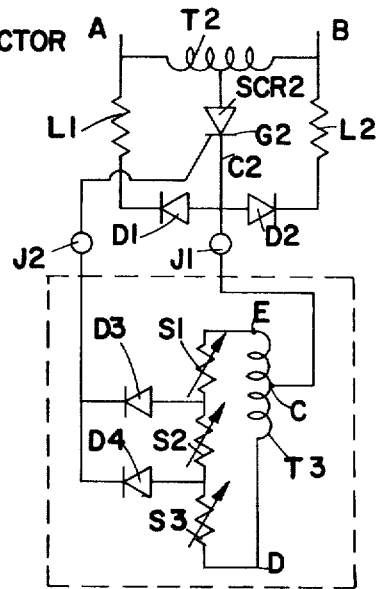

Referring again to FIG. 1 and the simplified schematic circuit of FIG. 1A there is illustrated the bridge circuit 10 of the present invention including the circuit arrangement to achieve the improved sensitivity and an adjustible dead band. In operation of the improved circuit of FIG. 1A, to switch the SCR2 "on", the gate G2 must be positive relative to the cathode C2. If point B on transformer T2 is positive when G2 is positive, current will flow through $D_1$ and $L_1$. If point A on transformer T2 is positive when G2 is positive, current will flow through $D_2$ and $L_2$. The magnitude and phase of the potential input is applied to the gate G2 of the SCR2 is the output of the bridge 10. The change in resistance, i.e., increase or decrease of the sensor S3, determines the magnitude and phase output of the bridge 10. In order to increase the magnitude of the output potential for a specific resistance of the sensor S3 (this corresponds to a given percent RH) the potential supplied to the bridge — at points D and E coule increase. However, conventionally, an increase in supply potential across points D and E increases the current through the sensor S3 — which is limited typically to about 300 microamperes. Thus, if it is desired to increase the output of the bridge, another technique must be used.

In the preferred embodiment, the increase of resistance across S2 increases the output potential of bridge 10 between junctions J1 and J2. The phase of the potential is controlled by diodes $D_3$ and $D_4$; that is, a potential is applied to the gate G2 without increasing the current through the sensor S3. Diodes $D_3$ and $D_4$ permit a positive gate potential of any desired magnitude to be applied to the gate G2 when the sensor resistance S3 equals the set-point S1 resistance. The set-point resistance is set by adjusting the resistance of S1.

An example of the operation of the sensitivity circuit is given with specific reference to FIG. 1. The resistance of S1 and S3 are equal and the bridge is in balance. When point E is positive relative to point D, and the resistance of S3 is larger than the resistance of S1, current will flow from junction J1 to junction J2 through diode $D_3$ to fire SCR2. When point D is positive relative to point E, and the resistance of S3 is smaller than the resistance of S1, current will flow from junction J1 to junction J2 through diode $D_4$ to fire SCR2. When $D_3$ is conducting, diode $D_4$ is blocking and when $D_4$ is conducting, $D_3$ is blocking. A small increase in the sensor S3 resistance causes a voltage drop across the gate to fire the SCR2.

In actual operation, assume a 2 percent change in humidity is desired to fire SCR2 to humidify or dehumidfy, the 2% firing point is set by the resistance of S2. A change of more than 2 percent causes a change in the resistance S3 relative to resistance S1. This causes positive potential to be applied to the gate G2 of SCR2. The resistance of S2 may be adjusted to any level within a broad range. The phase of the change determines whether $D_3$ or $D_4$ is conducting through junctions J1 or J2 and hence passing current to lamps L1 or L2. Without diodes $D_3$ and $D_4$ and S2, the sensor S3 resistance would have to change considerably more to create a sufficient voltage drop to cause SCR2 to fire.

The further improvement to the bridge 10 is the anti-hunt circuit — hystersis effect. The photo-conductor P2 is in parallel with the resistor R3 (fixed). In this way, the voltage across the bridge is regulated by the transformer potential across transformer winding T1 and the drop across the resistor R3. When current is applied to either lamps L1 or L2 causing either to glow, the resistance of the photo-conductor P2 decreases drastically. This in turn increases the potential across points E and D to approximately that of the potential across transformer winding T3. The result then, is that the resistance of the sensor S3 makes a larger change necessary to turn off either lamp L1 or L2. A larger change than that to switch either lamp on - hence, the hysteresis effect.

Figure 6:
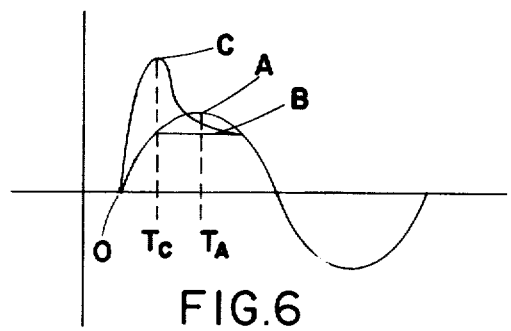
FIG. 6 is a comparison waveform of the circuit of the preferred embodiment with that of a conventional circuit.
Figure 4:
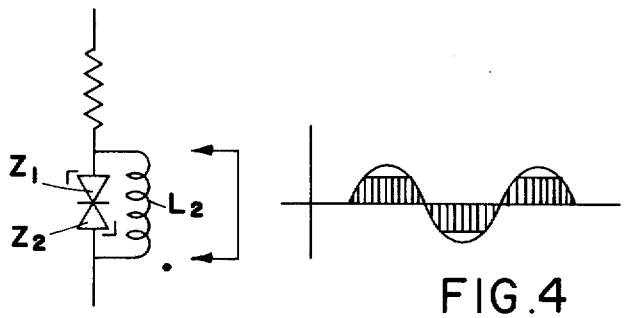
FIGS. 4 and 5 graphically illustrate the waveform of that portion of the circuit shown therewith.
Figure 5:
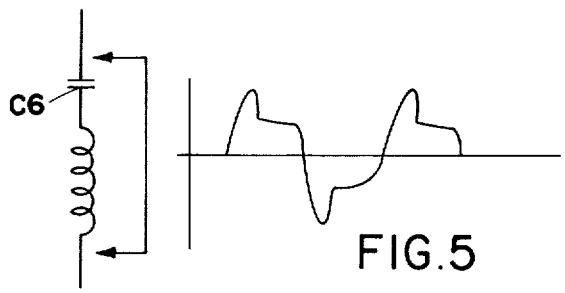

The waveforms of the circuit of FIG. 1 are shown in FIGS. 4, 5, and 6. At the zener diodes Z1 and Z2, the sine wave is clipped producing an input wave to the bridge transformer. The capacitor C6 on the secondary of the bridge transformer produces a wave to the SCR2 gate-cathode circuit as shown in FIG. 5. The result of the combination of zener diodes and capacitor is to reliably fire the SCR early in the cycle providing more power to the pilot lamp causing solid switching of the triac.

In comparison of the waveforms of the preferred embodiment with the waveforms of a conventional circuit, there is shown the advantage of the circuit of the present invention in FIG. 6. A simple sine wave a fires an SCR at time $t_a$ one-fourth wave length). A zener-clipped wave b can fire an SCR anywhere along the flat top portion depending on its slope. However, the circuit of the preferred embodiment fires an SCR at $t_c$ a short time after wave $c$ begins with a relatively high peak.

What is claimed is:

1. A condition responsive control circuit comprising:
   a bridge of interconnected electrical components balanced at some predetermined condition,
   one of said components variably responsive to variation to said predetermined condition,
   a semi-conductive responsive means, and
   a first and second gate means biased by said semiconductive means in response to either phase to an unbalance in said bridge;
   said bridge including an additional component connected between two of said interconnected components, and said additional component also connected to said first and second gate means, wherein said additional component operative to provide a set point for said variably responsive component comprises a pair of diodes and a variable resistor, one of said diodes current conducting and the other of said diodes blocking in dependance upon the direction of current flow through said resistor.

2. The control circuit of claim 1 wherein said gate means comprise a non-contact switch and an optical activating means connected to said switch.

3. The control circuit of claim 2 wherein said non-contact switch is a triac circuit.

4. The control circuit of claim 2 wherein said optical means comprises a lamp and a photoconductor.

5. The control circuit of claim 4 wherein said photoconductor is connected in a parallel configuration to one of said interconnected components in said bridge.

6. The control circuit of claim 4 wherein said optical means comprises a lamp and a photoconductor.

7. The control circuit of claim 2 wherein said optical activating means comprises a pair of back-to-back zener diodes and a first transformer winding.

8. The control circuit of claim 7 wherein said bridge of interconnected components includes a second transformer winding and a capacitor in series therewith and wherein said series connection is further connected across said bridge, said zener diodes together with said capacitors operative to control the firing point of said semi-conductive device.

9. The control circuit of claim 8 wherein said bridge further comprises another component connected between said series and said bridge.

10. The control circuit of claim 9 wherein said another component is a fixed resistive element also in parallel configuration to said photoconductive element.

* * * * *